(12) United States Patent
Roleder

(10) Patent No.: US 7,284,476 B2
(45) Date of Patent: Oct. 23, 2007

(54) CONTAINER ASSEMBLY FOR AGING A LIQUID

(76) Inventor: Jonathan Roleder, 14428 Rancho Del Prado Trail, San Diego, CA (US) 92127

(*) Notice: Subject to any disclaimer, the term of this patent is extended or adjusted under 35 U.S.C. 154(b) by 286 days.

(21) Appl. No.: 10/882,555

(22) Filed: Jul. 1, 2004

(65) Prior Publication Data

US 2006/0000362 A1   Jan. 5, 2006

(51) Int. Cl.
C12G 3/06 (2006.01)
C12H 1/22 (2006.01)

(52) U.S. Cl. ............... 99/277.2; 99/277.1; 426/330.4; 426/592

(58) Field of Classification Search ............... 99/277.1, 99/277.2, 277; 426/330.4, 422, 592; 217/72, 217/88
See application file for complete search history.

(56) References Cited

U.S. PATENT DOCUMENTS

| | | | |
|---|---|---|---|
| 2,017,235 A | 10/1935 | Drew | |
| 2,135,622 A | 11/1938 | Nagle | |
| 2,289,245 A | 7/1942 | Dant | |
| 2,657,629 A | 11/1953 | Gibson | |
| 3,021,780 A | 2/1962 | Bobbe | |
| 3,119,321 A * | 1/1964 | Deal | 99/277.1 |
| 4,073,955 A | 2/1978 | Koppelman | |
| 4,210,676 A | 7/1980 | Dudar et al. | |
| 4,558,639 A | 12/1985 | Hojnoski | |
| 4,838,419 A * | 6/1989 | Weits et al. | 206/386 |
| 5,054,381 A * | 10/1991 | DePeaux et al. | 99/277.1 |
| 5,092,488 A | 3/1992 | Pradel | |
| 5,311,811 A * | 5/1994 | Kuzyk | 99/277.1 |
| 5,537,913 A | 7/1996 | Vowles | |
| 5,960,708 A * | 10/1999 | DeTemple et al. | 99/472 |
| 6,378,419 B1 | 4/2002 | Ecklein | |

OTHER PUBLICATIONS

Oak Alternatives, Tank Stave Systems. "Tank Stave Systems." 4 pages. http://www.worldcooperage.com/pages/product_alt_tss.html (Nov. 11, 2003).
Oak Alternatives. Barrel Renewal Systems. "Product Information & Ordering." 7 pages. http://www.worldcooperage.com/media/cartimages/alt_brs_1x1_large.jpg. (Nov. 11, 2003).
Tagliabue, John. "Wine Without Barrels? Sacre Bleu!" *The New York Times*. Oct. 5 or 6, 2003.
Barrel Builders, Inc. "Barrel Builders: Insert Systems." 3 pages. http://barrelbuilders.com/pg15.htm. Nov. 11, 2003.

* cited by examiner

*Primary Examiner*—Reginald L. Alexander
(74) *Attorney, Agent, or Firm*—Steven G. Roeder; James P. Broder

(57) ABSTRACT

A container assembly (10) for retaining a liquid (16) during aging of the liquid (16) includes a container (12), a flavor insert (224) and an insert retainer (222). The container (12) defines a chamber (226) that retains the liquid (16). Further, the container (12) includes a wall (228A) having a container opening (228D) and a movable section (18) that selectively closes the container opening (228D). The flavor insert (224) imparts a flavor on the liquid (16). The insert retainer (222) is positioned in the chamber (226). The insert retainer (222) selectively retains the flavor insert (224) in the chamber (226) so that the flavor insert (224) can selectively removed from the insert retainer (222) and the container (12) via the container opening (228D) when the container (12) retains the liquid (16). In one embodiment, the flavor insert (224) can be selectively inserted into the insert retainer (222) via the container opening (228D) when the container (12) is retaining the liquid (16).

28 Claims, 6 Drawing Sheets

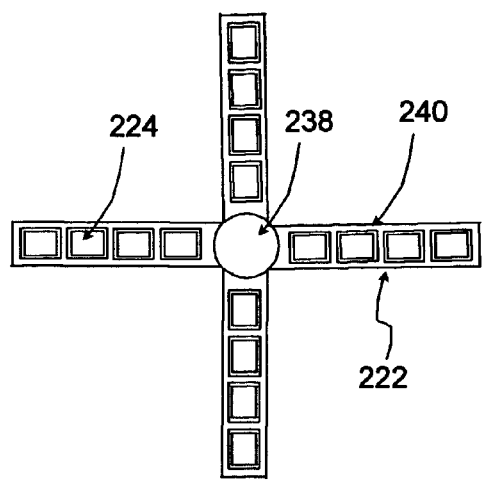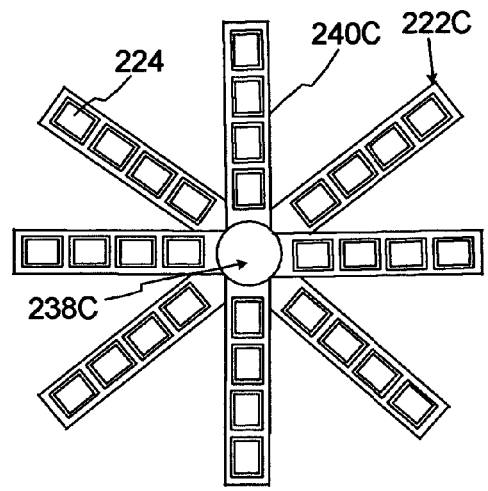
Fig. 3A    Fig. 3C
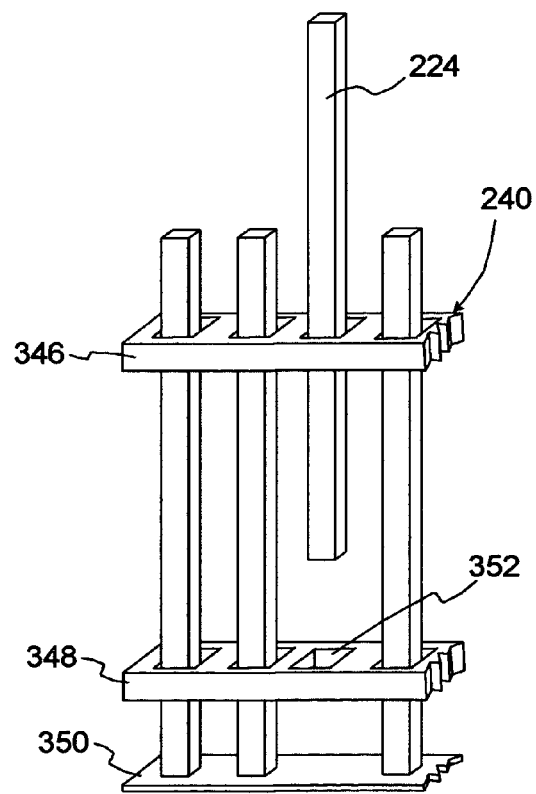
Fig. 3B

CONTAINER ASSEMBLY FOR AGING A LIQUID

BACKGROUND

Wood barrels are commonly used to age wine and other beverages. Unfortunately, wood barrels are relatively expensive to make and have a relatively short operational life. For example, a high end barrel used for only the finest wines is typically made from French oak and is very expensive. Additionally, the chemical ability of the wood to effect and impart flavor nuances expires rapidly and a wood barrel can typically only be considered to be in its prime for two to three years, e.g. one to two vintages. Once the traditional wood barrel had exhausted its chemical ability to impart flavors on the liquid, the conventional barrel is often sold on the used market or committed to lesser quality beverages. This creates a rapidly depreciating asset and investment for the beverage maker.

Moreover, different species of wood impart different flavors on the beverages. Accordingly, different types of wooden barrels are used for different types of beverages. The type of wood used for the barrel will depend upon desires of the beverage maker. With a traditional wooden barrel, the beverage maker makes a substantial investment in a particular type of barrel that is of a particular wood and flavor for a specific type of wine, whiskey or brandy. The barrel selection once made is irreversible and can be used for only one purpose or type of wine or beverage.

Additionally, if the beverage maker determines that the beverage being aged is not obtaining the desired flavor, the beverage maker does not have many options.

SUMMARY

The present invention is directed to a container assembly for retaining a liquid during aging of the liquid. In one embodiment, the container assembly includes a container, a first flavor insert and an insert retainer. The container defines a chamber that retains the liquid. Further, the container includes a wall having a container opening, and a movable section that selectively closes the container opening. The first flavor insert imparts a flavor on the liquid. The insert retainer is positioned in the chamber. The insert retainer selectively retains the first flavor insert in the chamber so that the flavor insert can selectively removed from the insert retainer and the container via the container opening when the container retains the liquid. With this design, the flavor insert can be selectively inserted into the insert retainer via the container opening when the container is retaining the liquid.

In one embodiment, the container assembly includes a second flavor insert and the insert retainer selectively retains the second flavor insert spaced apart from the first flavor insert. Further, the insert retainer can maintain the flavor inserts spaced apart from the movable section and the rest of the container.

In one embodiment, the flavor insert can be made of wood and the movable section can be made of a material that imparts substantially no flavor on the liquid during the aging.

The container assembly can also include a section retainer that selectively secures the movable section to the container body. Moreover, the container assembly can include a chamber seal that seals the movable section to the wall. In one embodiment, the wall includes a lift aperture that allows for easy access with a fork from a forklift.

Additionally, in one embodiment, the container assembly includes an insert mover that moves the flavor insert while the flavor insert is in the chamber. For example, the insert mover can include a handle that is selectively coupled to the insert retainer and the flavor insert.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3A is a top view of an insert retainer and a plurality of flavor inserts having features of the present invention;

FIG. 3B is a perspective view of a portion of the insert retainer and a plurality of flavor inserts;

FIG. 3C is a top view of another embodiment of an insert retainer and a plurality of flavor inserts having features of the present invention;

DESCRIPTION

Figure 1:
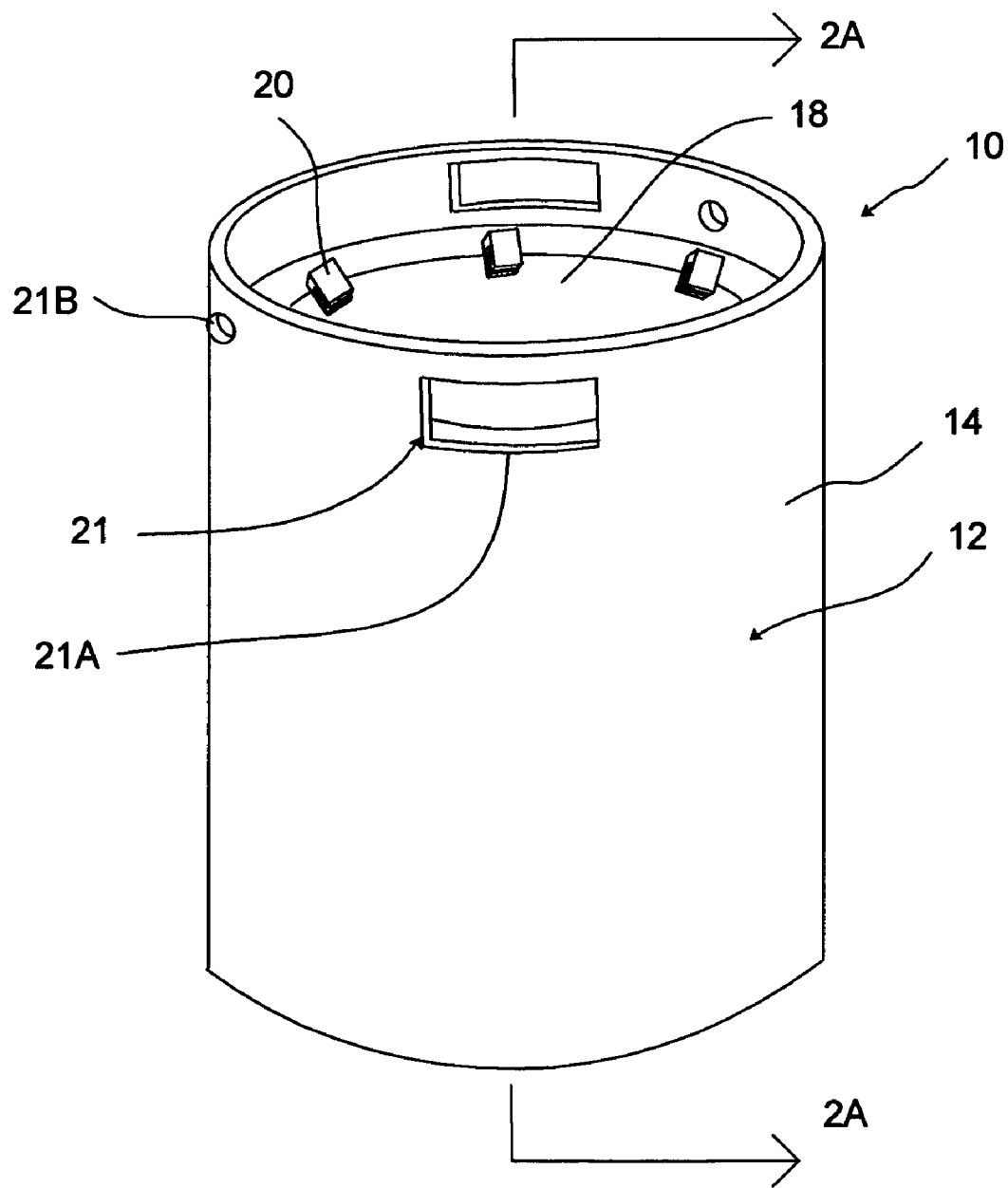
FIG. 1 is a perspective view of a first embodiment of a container assembly having features of the present invention.

FIG. 1 illustrates a container assembly 10 having features of the present invention. The size, shape, and number of components in the container assembly 10 can be varied to suit the design requirements of the container assembly 10. In the embodiment illustrated in FIG. 1, the container assembly 10 includes a container 12 having (i) a container body 14 that retains a liquid 16 (illustrated in FIG. 2A), (ii) a movable section 18 that allows for access into the container 12, and (iii) one or more section retainers 20 that can be used to selective secure the movable section 18 to the container body 14.

In the embodiment illustrated in FIG. 1, the container body 14 is generally barrel shaped and the movable section 18 is positioned near the top of the container body 14. Alternatively, for example, the container body 14 can be another shape, e.g. rectangular box shaped, and the movable section 18 can be located elsewhere. Further, in FIG. 1, the container assembly 10 includes eight spaced apart section retainers 20 (only three are shown). Alternatively, for example, the container assembly 10 can include less than eight or more than eight section retainers 20.

Figure 2A:
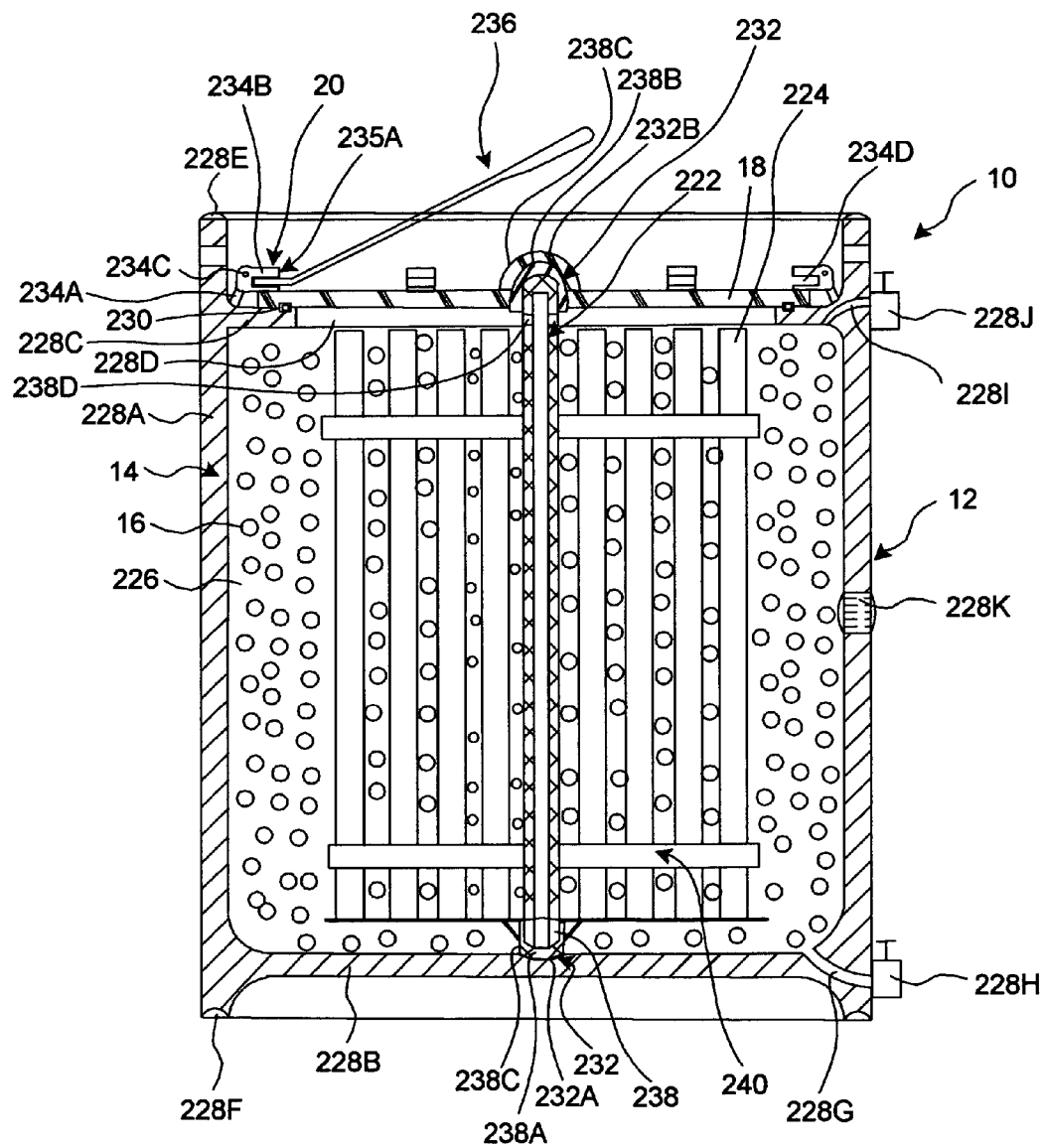
FIG. 2A is a cross-sectional view taken on line 2A-2A in FIG. 1.

Additionally, in one embodiment, the container body 14 includes one or more body apertures 21. As examples, the body apertures 21 can include (i) one or more rectangular shaped lift apertures 21A that are sized and shaped to be engaged by the fork of a forklift to lift and move the container body 14, and (ii) one or more cylindrical shaped, attachment apertures 21B that can be used to secure multiple container bodies 14 together as discussed below. In FIG. 2A, the body apertures 21 are located near the top of the container body 14. However, the body apertures 21 can be located elsewhere and/or be different shapes.

Referring to FIG. 2A, the container assembly 10 can be used to impart a flavor on the liquid 16 (illustrated as circles) during an aging process. In one embodiment, the container assembly 10 allows for the total control of the aging of the liquid 16, including optimum processing and aging opportunities for the liquid 16. Stated another way, the container assembly 10 can be used to precisely create the perfect environment for aging the liquid 16 so that the highest quality beverage can be achieved. Further, the container assembly 10 can be easily adjusted to be used for different types of liquids 16 and the container assembly 10 can be adjusted during the aging process, if necessary, to alter the aging process.

The type of liquid 16 aged in the container assembly 10 can vary. For example, the liquid 16 can be a red wine, white wine, port, whiskey, brandy, or other beverages.

FIG. 2A illustrates that the container assembly 10 includes an insert retainer 222 and one or more flavor inserts 224. Moreover, the container 12 defines a chamber 226 that receives the insert retainer 222, the flavor inserts 224, and the liquid 16 during the aging process. In alternative non-exclusive embodiments, the chamber 226 is sized and shaped to retain approximately 5, 10, 25, 55, 100, 500, 1000, 2500 or 5000 gallons of liquid 16. However, the chamber 226 can be larger or smaller.

In one embodiment, the container body 14 includes a tubular side wall 228A, a disk shaped bottom 228B, and an annular ring shaped top 228C that defines container opening 228D. In one embodiment, the container opening 228D is sufficiently large enough so that the insert retainer 222 and one or more of the flavor inserts 24 can pass through the container opening 228D. In the embodiment illustrated in FIG. 2A, the container opening 228D is large enough so that the insert retainer 222 and all of the flavor inserts 24 can pass through the container opening 228D simultaneously.

In FIG. 2A, the top of the side wall 228A includes a container guide 228E, e.g. an annular shaped, convex protrusion, and the bottom of the side wall 228A includes a container guide receiver 228F, e.g. an annular shaped groove having a concave cross-section. With this design, multiple containers 12 can be readily and securely stacked on top of each other.

Additionally, in FIG. 2A, the container body 14 includes (i) a lower chamber aperture 228G positioned near the bottom of the side wall 228A, (ii) a lower valve 228H that can be used to selectively open and close the lower chamber aperture 228G, (iii) an upper chamber aperture 228I positioned near the top of the side wall 228A, (iv) an upper valve 228J that can be used to selectively open and close the upper chamber aperture 228I, and (v) a chamber view port 228K, e.g. a transparent material, that allows for viewing into the chamber 226. In one embodiment, the lower chamber aperture 228G is used to drain the chamber 226 and the upper chamber aperture 228I is used to fill the chamber 226 or as an overflow during filling. It should be noted that the location of these components can be changed and that some or all of these components can be optional.

FIG. 2A also illustrates the movable section 18 in more detail. In this embodiment, the movable section 18 is generally disk shaped and covers the container opening 228D. Further, the movable section 18 is designed to be completely removed from the rest of the container 12. Alternatively, for example, the movable section 18 can be designed to pivot or slide relative to the rest of the container 12.

In one embodiment, the container assembly 10 includes a chamber seal 230 that is used to selectively seal the movable section 18 to the container body 14. For example, the chamber seal 230 can be a hollow, annular shaped seal that is made of a resilient material. In FIG. 2A, the chamber seal 230 fits into an annular groove in the top 228C and an annular groove in the bottom of the movable section 18. With this design, the chamber 226 can be selectively made to be substantially airtight. As a result thereof, in certain designs, the chamber 226 can be used to inhibit evaporation of the liquid 16 during the aging process and reduce the amount of liquid 16 lost during aging.

Additionally, in one embodiment, the container 12 can include one or more retainer holders 232 that selectively hold the insert retainer 222 spaced apart from the rest of the container 12. For example, in FIG. 2A, the container 12 includes a lower retainer holder 232A, e.g. a concave groove in the bottom 228B and an upper retainer holder 232B, e.g. a concave groove in the movable section 18 that cooperate to selective retain the insert retainer 222 spaced apart from the rest of the container body 14. In one embodiment, the retainer holders 232 also allow for the rotation of the insert retainer 222 and the flavor inserts 224 relative to the container 12.

In one embodiment, the container body 14 and the movable section 18 are made of materials that impart substantially no flavor on the liquid 16 and that are substantially liquid impervious. For example, in one embodiment, one or both of the container body 14 and the movable section 18 are made of stainless steel or aluminum. With this design, the container body 14 and the movable section 18 can be easily cleaned and reused with many different liquids 16. Stated another way, the container body 14 and the movable section 18 can be used over and over with new flavor inserts 224 for different or similar liquid 16 types. The container body 14 and the movable section 18 need only be purchased once. Further, the user can merely change and adjust the flavor inserts 24 to have complete control over the aging of the liquid 16. In summary, the container body 14 and the movable section 18 can be used for a variety of alcoholic beverages due to the flexibility of the flavor inserts 24 being removable and changeable from the chamber 26 as detailed below. Thus, the container assembly 10 provides complete flexibility to the user.

Further, once the initial investment in container 12 is made, the cost to achieve the highest barrel quality is only a function of the cost of the flavor inserts 224. As an example, a typical high end barrel used for only the finest wines is typically made from French oak and can cost approximately $600. To achieve the same French oak surface area ration to volume of liquid with the present design, it can cost between approximately $30 to $40. This allows maker with a limited financial resource the opportunity to use high end wood flavoring components every vintage with totally flexible barrel inventory.

FIG. 2A also illustrates the section retainers 20 in more detail. In this embodiment, the section retainers 20 cooperate to urge the movable section 18 against the chamber seal 230 and the chamber seal 230 against the top 228C to seal the container opening 228D. The design of each section retainer 20 can be varied. In FIG. 2A, each section retainer 20 is a flip type latch that includes (i) a latch base 234A that is secured to and cantilevers away from the top 228C, (ii) a latch engager 234B, and (iii) a latch pin 234C that connects the latch engager 234B to the latch base 234A and allows the latch engager 234B to pivot relative to the latch base 234A between an engaged position 235A and a disengaged position 235B (illustrated in FIG. 2B). As illustrated in FIG. 2A, in the engaged position 235A, the latch engager 234B engages the top of the movable section 18 and urges the movable section 18 against the chamber seal 230. In the disengaged position 235B, the latch engager 234B is rotated away from the top of the movable section 18. When each section retainers 20 is rotated to the disengaged position 235B, the movable section 18 can be removed so that the container opening 228D is open.

In one embodiment, the latch engager 234B includes a slot 234D for receiving a tool 236. In this embodiment, the tool 36 can be inserted into the slot 234D and rotated to easily move the latch engager 234B between the engaged position 235A and the disengaged position 235B. With this design, the chamber 226 can be opened relatively easily and quickly.

The insert retainer 222 selectively retains one or more of the flavor inserts 224 and allows for the insertion or removal of one or more of the flavor inserts 224. In one embodiment, the insert retainer 222 retains the flavor inserts 224 spaced apart so that almost the entirety of each flavor insert 224 is exposed to the liquid 16 in the chamber 226. Additionally, in one embodiment, the insert retainer 222 retains the flavor inserts 224 in a fashion that allows the flavor inserts 224 to expand and contract.

In one embodiment, insert retainer 222 allows the flavor inserts 224 to be added and removed from the insert retainer 222 while the chamber 226 is full or partly full of the liquid 16 and the insert retainer 222 is at least partly within the chamber 226. This feature allows the user to easily alter the number and/or type of flavor inserts 224 to precisely control and adjust the flavor imparted upon the liquid 16 by the flavor inserts 224 at any and every stage of the aging process.

The ability to impact the flavor of the liquid 16 by inserting different types of flavor inserts 224 into the chamber 226 is a great benefit in creating the finest beverage possible during the aging process. For example, at the beginning of the aging process, ten flavor inserts 224 can be placed in the chamber 226. The flavor inserts 224 can be a first type of wood or some of the flavor inserts 224 can be of the first type of wood and some of the flavor inserts 224 can be of another type of wood. Subsequently, during the aging process, one or more flavor inserts can be added or removed from the chamber 226 to adjust and influence the aging process. If flavor inserts are added, the flavor inserts 224 can be of the first type of wood or another type of wood.

In one embodiment, the insert retainer 222 includes (i) an insert beam 238 and (ii) one or more retainer racks 240 that are secured to the insert beam 238. In FIG. 2A, the insert beam 238 is a tubular shaped rod that includes (i) a lower retainer mount 238A that engages the lower retainer holder 232A and (ii) an upper retainer mount 238B that engages the upper retainer holder 232B to secure the insert retainer 222 to the container 12. In one embodiment, at least one of the retainer mounts 238A, 238B includes a plastic bearing 238C that allows for easy rotation of the insert retainer 222 relative to the container 12. Additionally, in one embodiment, the insert beam 238 includes a beam aperture 238D positioned between the top and bottom of the insert beam 238 that can be used to hold the insert retainer 222 partly or fully outside the chamber 226 as described below.

The one or more flavor inserts 224 impart a flavor on the liquid 16 during the aging process. The number of flavor inserts 224 utilized and the type of flavor inserts 224 utilized can be adjusted to precisely adjust the desired outcome of the liquid 16. With this design, the perfect material and the perfect amount of material for the liquid 16 for extracting flavor during the aging process can be utilized. The ideal wood specie suited for extracting and transferring the perfect flavor and sensory experience form the wood is extremely important. The wood specie best suited for a particular type of liquid 16 is a complex science and is constantly changing with respect to a particular vintage, type of liquid, and style of maker. The present invention provides flexibility during the aging process.

As non-exclusive examples, one or more of the flavor inserts 24 can be made of different species of wood, such as white oak, red oak, redwood, douglas fir, maple, birch, hickory, and/or any combination thereof. In one embodiment, one or more of the flavor inserts 224 extend approximately the length of the chamber 226. Alternatively, for example, one or more of the flavor inserts 224 can extend only a portion of the length of the chamber 226. Moreover, with the present design, the flavor inserts 224 can be easily stored in a controlled environment and easily shipped. This provides flexibility to the maker to easily obtain the desired flavor inserts 224.

Figure 2B:
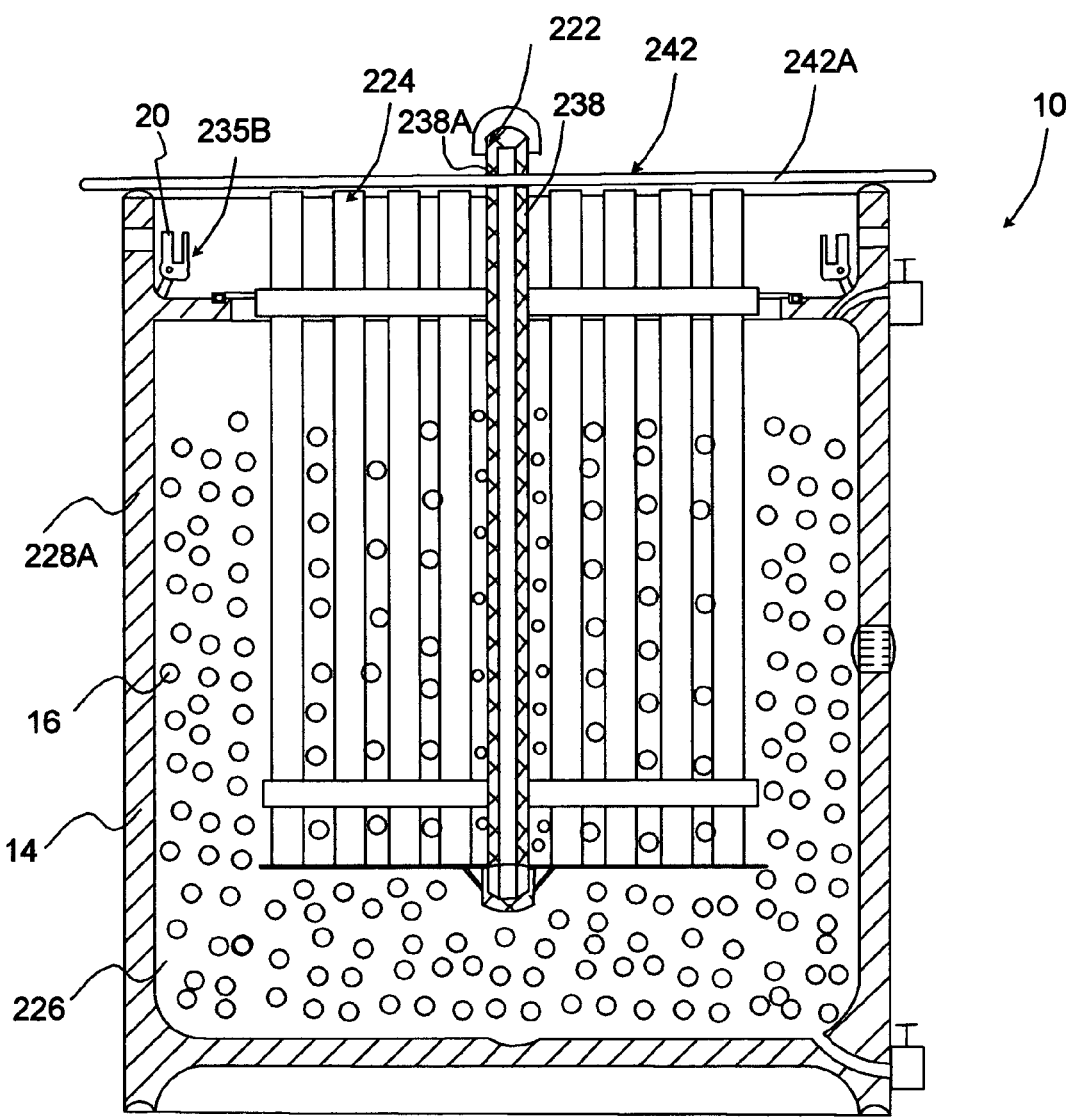
FIG. 2B is an alternative cross-sectional view of the container assembly.

FIG. 2B is a cross-sectional view of the container assembly 10 with (i) the section retainers 20 rotated and in the disengaged position 235B, (ii) the movable section 18 (not shown) removed from the container body 14, and (iii) the insert retainer 222 and the flavor inserts 224 retained partly outside the chamber 226. In one embodiment, the container assembly 10 includes a retainer holder 242 that selectively holds the insert retainer 222 and the flavor inserts 224 partly or fully outside the chamber 226, and above the chamber 226. In the embodiment illustrated in FIG. 2B, the retainer holder 242 includes a retainer beam 242A that extends through the beam aperture 238D in the insert beam 238 and across the top of the side wall 228A. With this design, the insert retainer 222 and the flavor inserts 224 are maintained partly outside the chamber 226.

At this position, the flavor inserts 224 can be easily added, removed or replaced from the insert retainer 222 while the liquid 16 is in the chamber 226. Stated another way, the flavor inserts 224 can be removed, renewed, changed, added to or decreased from during the aging process, while the liquid 16 is still in the chamber 226. The flexibility to change, add or remove the flavor inserts 224 continues through the complete aging process right up to the bottling, This process can be repeated as many times as necessary to extract the optimum flavor and structure from the flavor inserts 224. With this design, in one embodiment, for example, if the oak flavoring of a particular vintage is not developing enough oak structure in the flavor or perhaps developing to much oak flavor the winemaker can simply remove the movable section 18, raise the insert retainer 222 and add or remove flavor inserts 224 as desired.

FIG. 3A is a top plan view of one embodiment of the insert retainer 222 and the flavor inserts 224. In this embodiment, the insert retainer 222 includes the insert beam 238 and four retainer racks 240 that extend radially from the insert beam 238. Alternatively, for example, the insert retainer 222 can include more than four or less than four retainer racks 240 or the insert retainer 222 can have another configuration. Further, in this embodiment, each flavor insert 224 has a generally rectangular shaped cross-section and each retainer rack 240 is designed to selectively receive and retain four spaced apart flavor inserts 224. Alternatively, for example, one or more of the flavor inserts 224 can have another cross-sectional shape, such as a circular, oval, triangle, or an octagon. Further, the one or more of the retainer racks 240 can be designed to hold more than four or less than four flavor inserts 224.

FIG. 3B is a perspective view of one of the retainer racks 240 with one of the flavor inserts 224 partly removed from the retainer rack 240. In this embodiment, the retainer rack 240 includes (i) an upper cross beam 346, (ii) a lower cross beam 348, and a stop beam 350. Further, the beams 346, 348, 350 are aligned vertically and extend substantially parallel from the insert beam 238. Moreover, each crossbeam 346, 348 includes a four spaced apart insert apertures 352 that are sized and shaped to receive the flavor inserts 224. The insert apertures 352 of the upper cross beam 346 are aligned with the insert apertures 352 of the lower cross beam 348. In FIG. 3B, each insert aperture 352 is a generally rectangular shaped opening that is slightly larger that the cross-section of the flavor inserts 224. Alternatively, for example, one or more of the insert apertures 352 can be another shape, such as a circle, a triangle or an octagon.

With this design, a flavor insert 224 can be added to the retainer rack 240 by sliding the flavor insert 224 into an open insert aperture 352 in the upper cross beam 346, into the corresponding insert aperture 352 in the lower cross beam 348 and against the stop beam 350. In this embodiment, the stop beam 350 inhibits further movement of the flavor insert 224 downward relative to the retainer rack 240.

With the present design, the number of flavor inserts 224 can range from none, to several, to very dense packing. The liquid could potentially develop the flavor components in approximately half the time or even less, than when aged in conventional barrel. The time value of the aging process can be significantly increase the rate of return on investment. Conversely the flavor could be slowed down during the aging process if the timing of the bottling process was not optimum.

FIG. 3C is a top plan view of another embodiment of the insert retainer 222C and the flavor inserts 224. In this embodiment, the insert retainer 222C includes the insert beam 238C and eight retainer racks 240C that extend radially from the insert beam 238. Further, in this embodiment, each flavor insert 224 has a generally rectangular shaped cross-section and each retainer rack 240C is designed to selectively receive and retain four spaced apart flavor inserts 224. Alternatively, for example, one or more of the flavor inserts 224 can have another cross-sectional shape, such as a circular, oval, triangle, or an octagon. Further, the one or more of the retainer racks 240C can be designed to hold more than four or less than four flavor inserts 224.

Figure 4A:
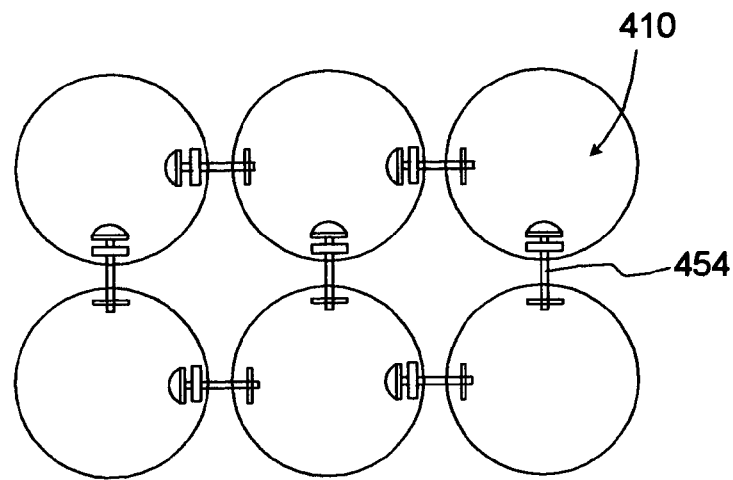
FIG. 4A is a top plan view of a plurality of container assemblies having features of the present invention.

FIG. 4A is a top plan view of a plurality of container assemblies 410 that are secured and connected together with a plurality of container retainers 454. In this embodiment, six container assemblies 410 are securely connected together. Alternatively, any number greater than two container assemblies 410 can be secured together. With this design, the container assemblies 410 can be stored securely and the containers are less prone to tipping in the event of an earthquake or other event that may knock over the container assemblies 410. For example, the container assemblies 410 can be secured together for safe transport on a pallet (not shown).

Figure 4B:
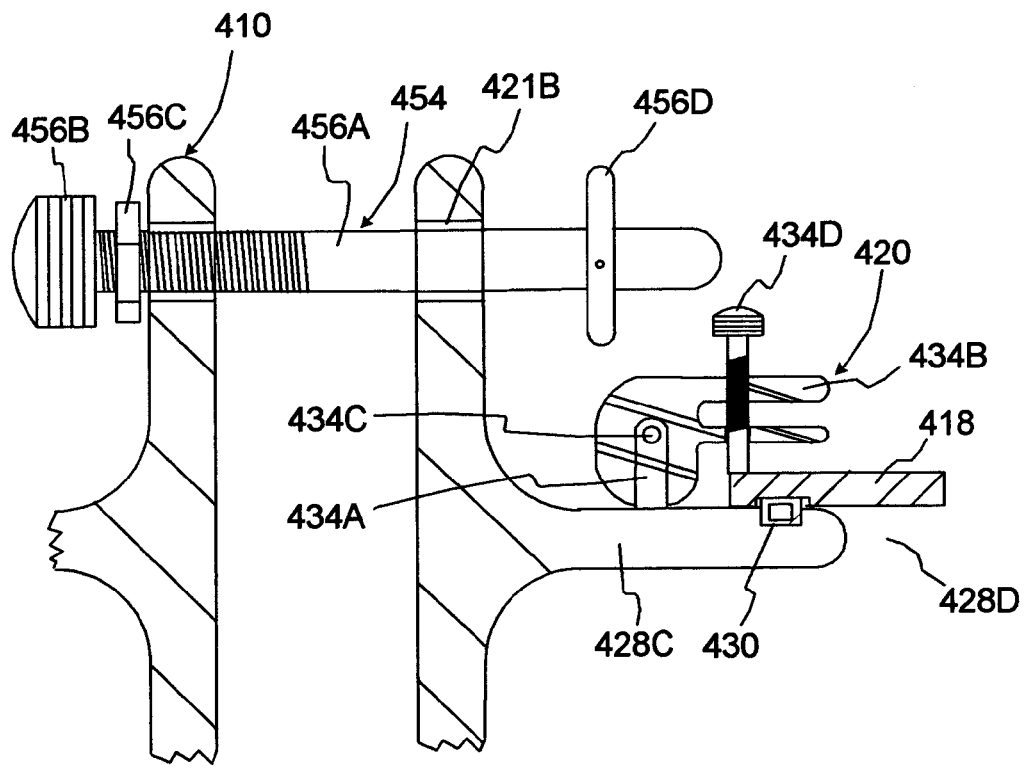
FIG. 4B is an enlarged cross-sectional view of a portion of pair of container assemblies having features of the present invention.

FIG. 4B is an enlarged cross-sectional view of a portion of two container assemblies 410 and one embodiment of a container retainer 454 securing the container assemblies 410 together. In this embodiment, the container retainer 454 includes (i) a connector beam 456A having a distal end and a proximal end, (ii) a connector head 456B that is fixedly secured to the proximal end, (iii) an adjustable nut 456C that is threaded onto the connector beam 456A, and (iv) a flip latch 456D that is pivotable secured to the connector beam 456A near the distal end. In this embodiment, the flip latch 456D is pivotable between a first position in which the latch 456D is substantially perpendicular to the connector beam 456A and a second position in which the latch 456E is substantially parallel with the connector beam 456A. With this design, with the flip latch 456D rotated to the second position, the distal end of the connector beam 456A and the flip latch 456D can be inserted through the attachment apertures 421B in the container assemblies 410. Subsequently, the flip latch 456D can be rotated to the first position and the adjustable nut 456C rotated to pull the flip latch 456D against the container assembly 410 and the container assemblies 410 together. Alternatively, for example, the container retainer 454 can be another design, such as a simple bolt and nut combination.

FIG. 4B also illustrates another embodiment of a section retainer 420 in more detail. In this embodiment, the section retainer 420 urge the movable section 418 against the chamber seal 430 and the chamber seal 430 against the top 428C to seal the container opening 428D. In FIG. 2B, the section retainer 420 is a flip type latch that includes (i) a latch base 434A that is secured to and cantilevers away from the top 428C, (ii) a latch engager 434B, (iii) a latch pin 434C that connects the latch engager 434B to the latch base 434A and allows the latch engager 434B to pivot relative to the latch base 434A, and (iv) a latch adjuster 434D that is threaded through the latch engager 434B. In this embodiment, the latch adjuster 434D engages the top of the movable section 418 and urges the movable section 418 against the chamber seal 430. With this design, the latch adjuster 434D can be rotated to adjust the amount of pressure on the movable section 418. Further, in this embodiment the bottom of the latch engager 434B engages the top 428C to restrict rotation of the latch engager 434B.

Figure 5A:
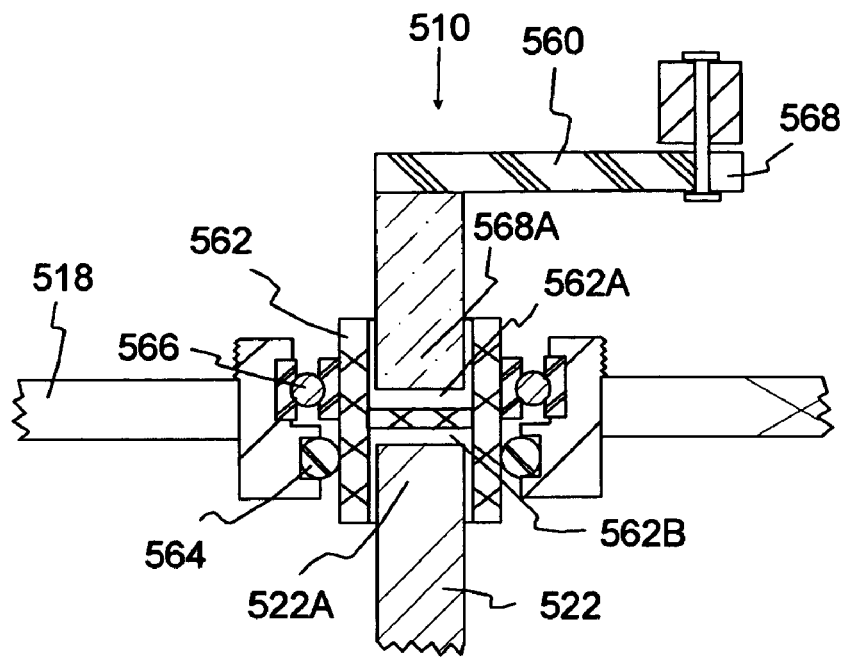
FIG. 5A is a cross-sectional view of a portion of another embodiment of a container assembly having features of the present invention.

FIG. 5A is cut-away view of a portion of another embodiment of the container assembly 510 having features of the present invention. In this embodiment, movable section 518 and the insert retainer 522 are slightly different. More specifically, in this embodiment, the container assembly 510 includes an insert mover 560 that can be used to selectively move and/or rotate the insert retainer 522 and one or more of the flavor inserts 224 (illustrated in FIG. 2A) relative to the movable section 518 and the rest of the container assembly 510.

The design of the insert mover 560 can vary. In FIG. 5A, the insert mover 560 includes (i) a pass through fitting 562 that extends through the movable section 518, (ii) a seal assembly 564 that seals the fitting 562 to the movable section 518, (iii) a bearing assembly 566 that rotatably couples the fitting 562 to the movable section 518 and allows the fitting 562 to rotate relative to the movable section 518, and (iv) a handle 568 that engages the fitting 562.

In this embodiment, the pass through fitting 562 includes an upper aperture 562A that receives and couples to the handle 568 and a lower aperture 562B that receives and couples to the insert retainer 522. As an example, each aperture 562A, 562B can define a rectangular shaped aperture. With this design, the bottom of the handle 568 can include a rectangular shaped section 568A that fits into and engages the upper aperture 562A and the top of the insert retainer 522 includes a rectangular shaped section 522A that fits into and engages the lower aperture 562B.

With this design, the handle 568 can be selectively engaged into the fitting 562 and the handle 568 can be used to selective rotate the insert retainer 522 without opening the chamber 526, with the chamber 526 sealed and with the chamber 526 full of liquid. Further, the movable section 518 can be selectively disengaged with the insert retainer 522. Alternatively, for example, the insert mover 560 can include a motor and/or can extend though the container assembly 510 at another location, such as through the bottom.

Figure 5B:
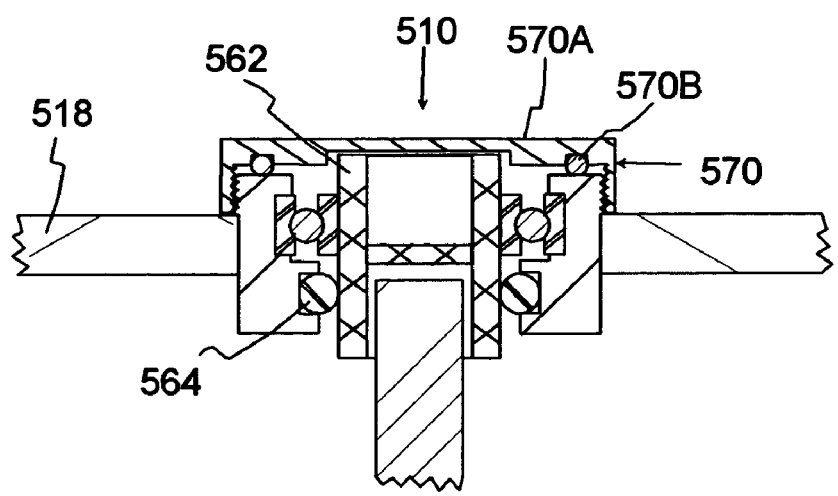
FIG. 5B is a cross-sectional view of the portion of the container assembly from FIG. 5A with a seal cap.

FIG. 5B is cut-away view of the portion of the container assembly 510 of FIG. 5A with the handle 568 (illustrated in FIG. 5A) removed and a cap assembly 570 secured to the movable section 518. In this embodiment, the cap assembly 570 can be selectively secured to the movable section 518 to selectively provide a backup or secondary seal and can be selectively removed to provide access for the handle 568 to be inserted into the pass through fitting 562. The design of the cap assembly 570 can be varied. In one embodiment, the cap assembly 570 includes a cap 570A that can be selectively threaded onto the movable section 518 and a cap seal 570B that engages the movable section 518. With this design, the cap assembly 570 provides a backup seal for any liquid the passes the seal assembly 564.

While the particular container assembly 10 disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A container assembly for retaining a liquid during aging of the liquid, the container assembly comprising:
    a container that defines a chamber that retains the liquid, the container including a wall having a container opening and a movable section that selectively closes the container opening;
    a first flavor insert that imparts a flavor on the liquid;
    a second flavor insert that imparts a flavor on the liquid; and
    an insert retainer that is positioned in the chamber, the insert retainer including a first insert aperture for selectively receiving the first flavor insert and a second insert aperture for selectively receiving the second flavor insert in the chamber so that the first flavor insert and the second flavor insert can selectively and individually be removed from the insert retainer and the container when the container retains the liquid and the insert retainer is positioned in the container; wherein at least one of the insert retainer and the first flavor insert is positioned above a periphery of the container opening when the movable section is removed from the wall and the first flavor insert is positioned on the insert retainer.

2. The container assembly of claim 1 wherein each flavor insert can be selectively inserted into one of the insert apertures of the insert retainer when the container is retaining the liquid.

3. The container assembly of claim 1 wherein the insert retainer selectively retains the second flavor insert spaced apart from the first flavor insert.

4. The container assembly of claim 1 wherein each flavor insert can be selectively slid into and out of the respective insert aperture.

5. The container assembly of claim 1 wherein the insert retainer maintains the flavor inserts spaced apart from the movable section.

6. The container assembly of claim 1 further comprising a section retainer that selectively secures the movable section to the wall.

7. The container assembly of claim 1 further comprising a chamber seal that seals the movable section to the wall.

8. The container assembly of claim 1 wherein the wall includes a lift aperture that allows for easy access with a fork from a forklift.

9. The container assembly of claim 1 further comprising an insert mover that moves the flavor insert relative to the container while the flavor insert is in the chamber.

10. The container assembly of claim 9 wherein the insert mover includes a handle that can be selectively coupled to the insert retainer.

11. The combination comprising a pair of container assemblies of claim 1 and a connector retainer that fixedly connects the container assemblies together.

12. The container assembly of claim 1 wherein each flavor insert is made of wood, the container is made of a material that imparts substantially no flavor on the liquid during the aging of the liquid and wherein the chamber is substantially and selectively sealed to inhibit the evaporation of the liquid from the chamber.

13. A container assembly for retaining a liquid during aging of the liquid, the container assembly comprising:
    a container that defines a chamber that retains the liquid, the container includes a wall having a container opening and a movable section that selectively closes the container opening;
    a pass through fitting that extends through the movable section and that is rotatable coupled to the movable section, the pass through fitting including a first end that is positioned inside the chamber when the movable section is secured to the wall, and a second end that is positioned outside the chamber when the movable section is secured to the wall;
    a seal assembly that seals the pass through fitting to the movable section;
    a flavor insert that imparts a flavor on the liquid; and
    an insert retainer that retains the flavor insert, the insert retainer being selectively coupled to the first end of the pass through fitting;
    wherein rotation of the second end of the pass through fitting rotates the flavor insert and the insert retainer in the chamber relative to the container while the liquid is in the chamber.

14. The container assembly of claim 13 further comprising a handle that can be selectively coupled to the second end of the pass through fitting so that rotation of the handle results in rotation of the pass through fitting and the insert retainer.

15. The container assembly of claim 13 wherein the insert retainer selectively retaining the flavor insert in the chamber so that the flavor insert can selectively removed from the chamber when the chamber retains the liquid.

16. The container assembly of claim 15 wherein the insert retainer can be selectively coupled and decoupled to the first end of pass through fitting when the chamber retains the liquid.

17. The container assembly of claim 16 wherein the flavor insert can be selectively inserted into the insert retainer when the container is retaining the liquid.

18. The container assembly of claim 16 wherein the flavor insert is made of wood, and the movable section is made of a material that imparts substantially no flavor on the liquid during the aging of the liquid.

19. The container assembly of claim 16 wherein the insert retainer maintains the flavor insert spaced apart from the movable section.

20. The container assembly of claim 16 further comprising a section retainer that selectively secures the movable section to the wall.

21. The container assembly of claim 14 wherein the flavor insert is made of wood, the container is made of a material that imparts substantially no flavor on the liquid during the aging of the liquid and wherein the chamber is substantially and selectively sealed to inhibit the evaporation of the liquid from the chamber.

22. A container assembly for retaining a liquid during aging of the liquid, the container assembly comprising:
   a container that defines a chamber that retains the liquid, the container including a wall having a container opening and a movable section that selectively closes the container opening, the chamber being substantially and electively sealed;
   a plurality of flavor inserts that imparts a flavor on the liquid;
   an insert retainer that is positioned in the chamber, the insert retainer including a plurality of spaced apart insert apertures for selectively retaining the flavor inserts in the chamber so that the flavor inserts can selectively and individually be added and removed from the container and the insert retainer when the container retains the liquid and the insert retainer is positioned in the container; wherein the insert retainer is movable relative to the container and the insert retainer is at least partly selectively removable from the container through the container opening; and
   a section retainer that selectively secures the movable section to the wall;
   wherein the container includes a retainer holder that selectively secures the insert retainer to the container, the retainer holder allowing the insert retainer to rotate relative to the container when the container opening is closed with the movable section.

23. A container assembly for retaining a liquid during aging of the liquid, the container assembly comprising:
   a container that defines a chamber that retains the liquid, the container including a wall having a container opening and a movable section that selectively closes the container opening, the chamber being substantially and selectively sealed, the container being made of a material that imparts substantially no flavor on the liquid during the aging of the liquid;
   a plurality of flavor inserts that imparts a flavor on the liquid;
   an insert retainer that is positioned in the chamber, the insert retainer including a plurality of spaced apart insert apertures for selectively retaining the flavor inserts in the chamber so that the flavor inserts can selectively and individually be added and removed from the container and the insert retainer when the container retains the liquid and the insert retainer is positioned in the container; wherein the insert retainer is movable relative to the container and the insert retainer is at least partly selectively removable from the container through the container opening;
   a section retainer that selectively secures the movable section to the wall; and
   an insert mover that moves the flavor inserts relative to the container while the flavor inserts are in the chamber.

24. A method for retaining a liquid during aging of the liquid, the method comprising the steps of:
   providing a container that defines a chamber that retains the liquid, the container including a wall having a container opening and a movable section that selectively closes the container opening;
   providing a first flavor insert that imparts a flavor on the liquid;
   providing a second flavor insert that imparts a flavor on the liquid;
   selectively retaining the first flavor insert and the second flavor insert in the chamber with an insert retainer so that the first flavor insert and the second flavor insert can be selectively and individually removed from the container and the insert retainer via the container opening when the container retains the liquid and the insert retainer is positioned in the container; wherein the insert retainer is movable relative to the container and the insert retainer is at least partly removable from the container through the container; and
   selectively moving the flavor inserts relative to the container with an insert mover while the container opening is closed with the movable section.

25. The method of claim 24 wherein the flavor insert can be selectively inserted into the insert retainer when the container is retaining the liquid.

26. The method of claim 24 wherein each flavor insert is made of wood, and the movable section is made of a material that imparts substantially no flavor on the liquid during the aging of the liquid.

27. The method of claim 24 wherein the insert retainer maintains the first flavor insert spaced apart from the movable section.

28. The method of claim 24 further comprising the steps of inserting a fork from a forklift into a lift aperture in the wall and lifting the container with the forklift.

* * * * *